W. L. WILLIAMS.
Chimney-Cap.
No. 196,409. Patented Oct. 23, 1877.
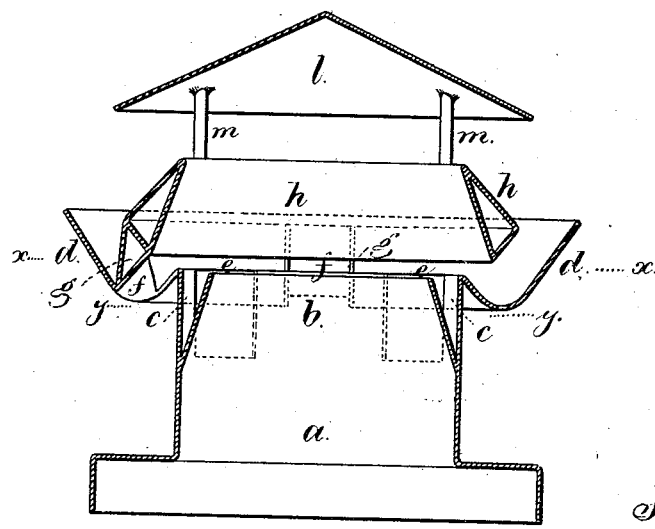
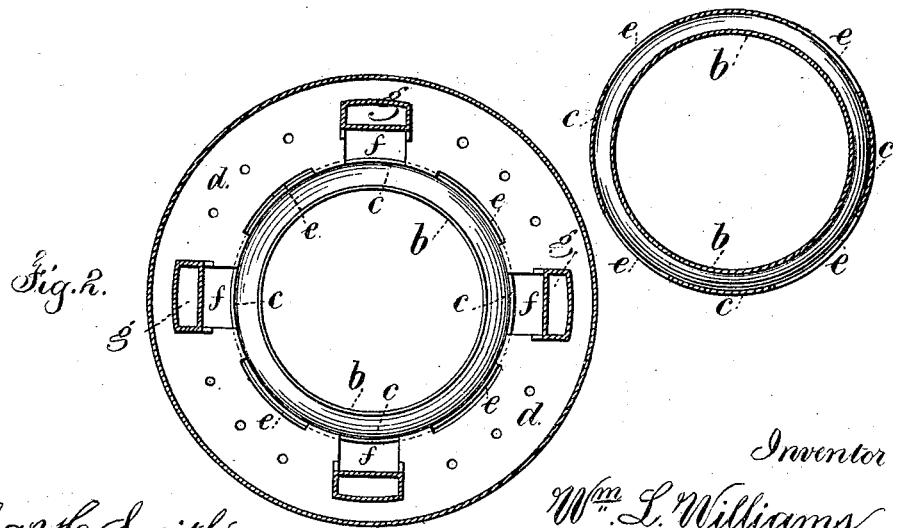
Witnesses
Chas. H. Smith
Harold Serrell
Inventor
Wm. L. Williams
per Lemuel W. Serrell
atty.

UNITED STATES PATENT OFFICE.

WILLIAM L. WILLIAMS, OF NEW YORK, N. Y.

IMPROVEMENT IN CHIMNEY-CAPS.

Specification forming part of Letters Patent No. 196,409, dated October 23, 1877; application filed March 28, 1877.

*To all whom it may concern:*

Be it known that I, WILLIAM L. WILLIAMS, of the city and State of New York, have invented an Improvement in Chimney-Caps, of which the following is a specification:

The object of this invention is to deflect the external currents of wind from the top of the flue, and thereby prevent the wind blowing down the chimney, and at the same time provide a free egress for the smoke and products of combustion.

Above and around the end of the flue is a double conical ring, surmounted by a conical shield, and below the ring is an annular disk with alternating upward and downward discharge-orifices, as hereinafter specified, to convey away the smoke or gases in whatever direction may harmonize with or be favored by the external currents of air.

In the drawing, Figure 1 is a vertical section of the said ventilator or chimney-cap. Fig. 2 is a sectional plan at the line $x\ x$, and Fig. 3 is a sectional plan at the line $y\ y$.

The parts are shown and described as circular, but they may be polygonal.

The cylindrical flue $a$ is made with a contracted upper end, $b$, and outside of this are the plates $c$, that extend up to the annular disk $d$, leaving openings at $e$ between these plates $c$, and intermediate to these openings $e$ are downward openings $f$, through the inner portion of the annular disk $d$, and outside these openings $f$ there are deflecting-plates $g$, extending up to and supporting the double conical ring $h$, that is above the smoke-flue $a$, and of slightly larger diameter, with the inner and outer surfaces as truncated cones, joined at the under side by a reverse truncated cone, and above the flue and conical ring is the conical cap $l$, supported upon the rods $m$.

The operation is that with lateral currents of air the conical exterior surface of the annular disk $d$ deflects the same downwardly, and the upper surface of the conical ring $h$ deflects the air upwardly, both of which tend to draw the air or gases from the vertical flue $a$.

According to the direction of the external currents, the air will pass up the openings $e$ at one side of the cap, and the gases will escape down the openings $f$ or $e$, or both, at the other side. In all instances it is impossible for the wind to blow down the chimney, and it will be deflected from the same, regardless of the direction of approach, and ample provision is made for the escape products of combustion to pass off in the same general direction as the wind, thus producing a constant upward current or suction in the flue $a$, so as to ventilate the chimney or space to which this cap is applied.

I have shown the upper end of the flue $a$ as contracted. It may, however, be straight, in which case the plates $c$ will be inclined outwardly.

I claim as my invention—

1. The flue $a$, double conical ring $h$, and conical cap $l$, in combination with the annular disk $d$, plates $c$ and $g$, and alternate upward and downward openings $e$ and $f$, substantially as and for the purposes set forth.

2. The combination of the flue $a$, double conical ring $h$, and annular disk $d$, substantially as set forth.

Signed by me this 23d day of March, A. D. 1877.

W. L. WILLIAMS.

Witnesses:
 GEO. T. PINCKNEY,
 CHAS. H. SMITH.